(12) United States Patent  
Sugawara

(10) Patent No.: US 8,716,996 B2  
(45) Date of Patent: May 6, 2014

(54) SWITCHING CONTROL CIRCUIT AND AC/DC CONVERTER USING THE SAME

(75) Inventor: Takato Sugawara, Matsumoto (JP)

(73) Assignee: Fuji Electric Co., Ltd., Kawasaki-Shi (JP)

(*) Notice: Subject to any disclaimer, the term of this patent is extended or adjusted under 35 U.S.C. 154(b) by 108 days.

(21) Appl. No.: 12/292,287

(22) Filed: Nov. 14, 2008

(65) Prior Publication Data

US 2009/0141523 A1   Jun. 4, 2009

(30) Foreign Application Priority Data

Nov. 16, 2007  (JP) .................................. 2007-298712

(51) Int. Cl.  
*G05F 1/00* (2006.01)

(52) U.S. Cl.  
USPC .......................................................... 323/283

(58) Field of Classification Search  
USPC ......... 323/274, 275, 276, 234, 237, 282–285; 363/50, 52, 53  
See application file for complete search history.

(56) References Cited

U.S. PATENT DOCUMENTS

| | | | |
|---|---|---|---|
| 6,967,851 B2 * | 11/2005 | Yang et al. | 363/16 |
| 7,772,786 B2 * | 8/2010 | Hosoda et al. | 315/291 |
| 2006/0152267 A1 * | 7/2006 | Ramprasad | 327/208 |
| 2006/0290337 A1 * | 12/2006 | Lhermite et al. | 323/316 |
| 2008/0094040 A1 * | 4/2008 | Soldano et al. | 323/205 |
| 2009/0021177 A1 * | 1/2009 | Cho et al. | 315/225 |
| 2009/0103338 A1 * | 4/2009 | Nakamura | 363/89 |
| 2009/0224686 A1 * | 9/2009 | Kunimatsu | 315/291 |

FOREIGN PATENT DOCUMENTS

JP            07-131984         5/1995

* cited by examiner

*Primary Examiner* — Adolf Berhane  
*Assistant Examiner* — Jeffrey Gblende  
(74) *Attorney, Agent, or Firm* — Rabin & Berdo, P.C.

(57) ABSTRACT

A switching control circuit for an AC/DC converter stops the switching of a switching device in a low-phase angle range of an AC power supply to prevent an improper recovery operation after a brownout is detected.

18 Claims, 4 Drawing Sheets

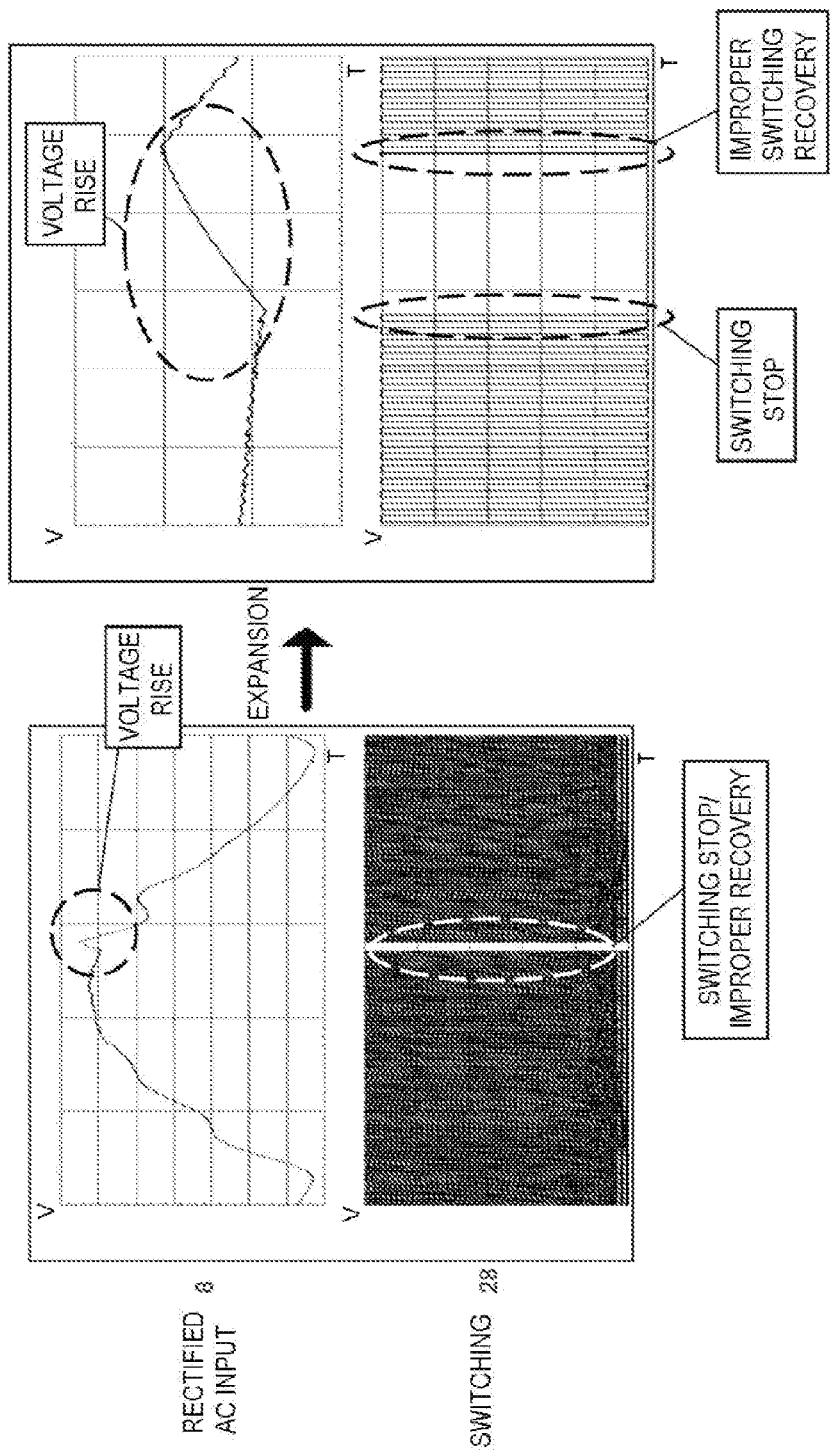

SWITCHING CONTROL CIRCUIT AND AC/DC CONVERTER USING THE SAME

CROSS-REFERENCE TO RELATED APPLICATION

This application claims the benefit of priority of Japanese patent application number 2007-298712, filed on Nov. 16, 2007, the entire disclosure of which is incorporated herein by reference.

FIELD OF THE INVENTION

The present invention relates to a switching control circuit that can conduct a switching stop operation due to a brownout in a low phase-angle range of an AC input (expressed by a sinusoidal waveform) so that an improper brown-in operation may be prevented.

BACKGROUND

FIG. 2 is a block diagram showing a conventional switching control circuit that includes a brownout detection function and a conventional AC/DC converter that employs the conventional switching control circuit. In FIG. 2, the conventional AC/DC converter includes high-frequency-cut filter 2 connected to AC power supply 1. The voltage of AC power supply 1 is Vin and the frequency thereof is 50 Hz, for example. (The high-frequency-cut filter 2 will be referred to simply as "noise filter 2" hereafter.) Noise filter 2 includes inductor 3, having an inductance L1, connected to AC power supply lines, and capacitor 4, connected between the AC power supply lines. An AC/DC converter of the foregoing description is disclosed, for example, in Unexamined Laid Open Japanese Patent Application Publication number Hie. 7 (1995)-131984 (FIGS. 1, 3, 5, and 7).

Full-wave rectifying circuit 5 includes rectifying diodes 6 and is connected to the output stage of noise filter 2. First smoothing capacitor 7, having a capacitance C1, is connected between the output terminal of full-wave rectifying circuit 5 and ground. Dividing resistor 9, having a resistance R1, and dividing resistor 10, having a resistance R2, are connected between output terminal 8, at which the voltage is Vm, and ground. The divided voltage of the voltage Vm, obtained from a connection point 11 of resistors 9 and 10, is connected to the negative input terminal of hysteresis comparator 22 in switching control circuit 20.

Conventional switching control circuit 20 includes a brownout detection function. Hysteresis comparator 22 compares the divided voltage, obtained by dividing the voltage Vm at output terminal 8 and connected to the negative terminal thereof, with a reference voltage 21 supplied to the positive input terminal thereof. When hysteresis comparator 22 detects that the divided voltage is lower than reference voltage 21, the output 23 of hysteresis comparator 22 feeds a high level signal (hereinafter referred to as an "H-level") to timer 24.

Timer 24 counts up the time period for which the output from hysteresis comparator 22 is at the H-level. If the counted-up time period exceeds a predetermined time period, the output 25 of timer 24 feeds an H-level signal to one of the input terminals of NOR circuit 26. If output 23 from hysteresis comparator 22 returns to a low level (hereinafter referred to as an "L-level") before the predetermined time period elapses, timer 24 is reset.

The other input terminal of NOR circuit 26 receives a high-frequency pulse signal 27 from a PWM control circuit (not shown) or from a PFM control circuit (not shown). Output 28 from NOR circuit 26 is fed to the gate terminal of switching device 15 and controls the ON and OFF state of switching device 15, which includes an N-channel MOSFET that is OFF when output 25 is at the H-level.

In the normal operation mode (excluding the operations for brownout detection), output 25 from timer 24 is set at the L-level. The L-level is fed as one of the inputs to NOR circuit 26, and high-frequency pulse signal 27 is fed as the other one of the inputs to NOR circuit 26. Therefore, NOR circuit 26 lets high-frequency pulse signal 27 pass without modification as output 28. Since output 28 is applied to the gate terminal of switching device 15, the switching ON and OFF of switching device 15 is controlled by output 28.

Output terminal 8 of full-wave rectifying circuit 5 is connected in series to reverse blocking diode 13 via inductor 12, having an inductance L2, as an energy storage element. Switching device 15 and resistor 16 are connected in series with each other between a connection point 14 of inductor 12 to reverse blocking diode 13 and ground. A second smoothing capacitor 18, having a capacitance C2, is connected between the ground and cathode terminal 17 of reverse blocking diode 13, the voltage at that point being denoted by $V_O$. The AC/DC converter is configured such that a desired DC voltage is obtained as the cathode terminal voltage $V_O$.

The brownout detection function will now be described. Generally, "brownout" implies that the power supply voltage is lower than a specified lower limit but higher than 0 V temporarily, and the apparatus is in an intermediate state immediately before stopping functioning (blackout). In the intermediate state, the apparatus cannot keep the normal state any more. Usually, the apparatuses are designed to perform a brownout detection function before the apparatus stops functioning (before a blackout occurs).

In a conventional switching control circuit 20, as shown in FIG. 2, that includes a brownout detection function, timer 24 starts operating if it is detected that the voltage Vm at output terminal 8 of full-wave rectifying circuit 5 drops below brownout (stopping) voltage level 29 as shown in the timing chart in FIG. 3. If the state in which the voltage Vm is below brownout voltage level 29 continues, timer 24 feeds output 25 set at the H-level to one of the input terminals of NOR circuit 26 after a predetermined time period set in timer 24 elapses. H-level output 25 from timer 24 sets output 28 from NOR circuit 26 at the L-level to control switching device 15 such that switching device 15 stops switching.

In the following, the input voltage at the instance at which switching device 15 stops switching is denoted by Vin0. The switching frequency (that is the frequency of pulse signal 27 inputted to NOR circuit 26) is significantly higher than the frequency of the voltage Vin (usually 50 to 60 Hz) inputted to noise filter 2 from AC power supply 1. Therefore, in an operation analysis based on the time width (on the switching period level) for which the current of inductor 12 varies, it may be reasonably assumed that the input voltage Vin0 at the instance at which switching device 15 stops switching is maintained. Described from another viewpoint, it may be reasonably assumed that the output voltage (cathode terminal voltage) $V_O$ does not vary with time (in the transient response at the instant at which the switching stops).

If the assumptions as described above are held, it may be reasonably expected that the voltage Vm at output terminal 8 of full-wave rectifying circuit 5 does not vary significantly. Therefore, the current that flows through inductor 3 increases when the input voltage value Vin is high enough to exceed Vm. When the input voltage Vin is low, the current that flows through inductor 3 decreases. In the steady state, the average value of the current that flows through inductor 3 is equal to the average value of the current that flows through inductor 12. Since the resistance values R1 and R2 of resistors 9 and 10 connected between output terminal 8 of full-wave rectifying circuit 5 and the ground are large, the current that flows through resistors 9 and 10 can be ignored.

If a brownout is detected and the switching is stopped (switching device 15 is made to be OFF), the current that flows through inductor 12, is reduced at a rate of $(V_O-Vm)/L2$. However, the current that flows through inductor 12 keeps charging second smoothing capacitor 18 until the current value becomes 0. The current to inductor 12 is fed from first smoothing capacitor 7 and inductor 3. When the input voltage Vin0 at the instant at which switching is stopped is higher than Vm, the current of inductor 12 keeps decreasing but the current of inductor 3 keeps increasing. The current of inductor 3 keeps increasing until the input voltage Vin0 becomes equal to or lower than Vm. (If Vin0−Vm is expressed by ΔV, the current of inductor 3 changes at the rate of ΔV/L1, when ΔV is larger than 0. The current of inductor 3 increases when ΔV is higher than 0, but decreases when ΔV is lower than 0.)

When the current that flows through inductor 12 immediately after the switching stops is higher than the current that flows through inductor 3, the voltage Vm becomes lower. As the voltage Vm becomes lower, the decreasing rate of the current that flows through inductor 12 and the increasing rate of the current that flows through inductor 3 become larger and larger. Finally, the magnitude relation between the current that flows through inductor 12 and the current that flows through inductor 3 is reversed.

When the current that flows through inductor 12 is lower than the current that flows through inductor 3, Vm increases. The current that flows through inductor 3 keeps increasing until Vm becomes higher than Vin0. Since the circuit that charges second smoothing capacitor 18 via inductor 12 constitutes a booster circuit as shown in FIG. 2, the relational expression $V_O$>Vm, Vin0 holds. Due to the relations described above, the current that flows through inductor 12 keeps decreasing and reaches 0 finally.

Even when Vin0 is equal to or lower than Vm, the current that flows through inductor 12 will become 0 before the current that flows through inductor 3 becomes 0, if Vm is high to an extent such that the absolute value of ΔV=Vin0−Vm is small and the current that flows through inductor 3 is high.

In the state in which the current that flows through inductor 12 is 0 and a current is still flowing through inductor 3, the right end of inductor 12 is brought into an open state and the current flowing through inductor 3 flows entirely into first smoothing capacitor 7. In other words, a resonance operation based on L1 that is, the inductance value of inductor 3) and C1 (that is, the capacitance value of smoothing capacitor 7) starts and Vm rises to the peak of the resonance. The peak of the resonance is higher as the value of the current that flows through inductor 3 at the start of the resonance is higher.

However, inductance 3 in noise filter 2 in the front stage of full-wave rectifying circuit 5 makes a current flow even when the switching is stopping. Therefore, the input voltage Vm for brownout detection will rise as shown in FIGS. 4(a) and 4(b), if the switching stops in the range in which the phase angle is high and a high current is flowing. If the rising input voltage Vm exceeds brown-in (recovery) voltage level 30 shown in FIG. 3, the switching operation will recover from the stopped state thereof caused by a brownout (an improper brown-in operation will be caused) before the conditions for the recovery from the stopping state caused by a brownout are obtained. The improper brown-in operation de-stabilizes the switching operation of the AC/DC converter.

In view of the foregoing, it would be desirable to provide a switching control circuit that stops the switching of a switching device in a low phase-angle range of an AC power supply, in which a not-so-high current is flowing, to prevent an improper recovery operation from occurring.

SUMMARY OF THE INVENTION

According to an aspect of the invention, there is provided a switching control circuit in an AC/DC converter that rectifies an AC input obtained via a noise filter with a rectifying circuit for obtaining an input voltage, the switching control circuit including:

a brownout detecting means, the brownout detecting means including a comparator for detecting a brownout state, and a timer means having as an input an output from the comparator, the timer means for monitoring whether the brownout state continues for a time period longer than a predetermined time period; and an improper brown-in operation preventing means for monitoring the rectified input voltage, the improper brown-in operation preventing means for preventing a switching operation in a range in which a phase angle of the AC input is low.

Advantageously, the improper brown-in operation preventing means includes:

a comparing means for comparing the voltage of the AC input with a reference voltage;

a first logic means for passing a clock signal if the comparing means detects that the voltage of the AC input is lower than the reference voltage;

a logic gate, such as a D-type flip-flop, including a clock terminal having as an input the clock signal passed by the first logic means, and a data terminal having as an input an output from the timer means; and a second logic means for passing or interrupting a switching control pulse signal based on an output from the D-type flip-flop.

Advantageously, the AC/DC converter, which rectifies an AC input obtained via a noise filter with a rectifying circuit for obtaining an input voltage, controls a switching device using the switching control circuit described above.

Since the switching control circuit according to the invention facilitates a switching stop due to a brownout in a low phase-angle range of the AC input, an improper brown-in operation is prevented.

Even when a noise filter is connected to an AC power supply, an AC/DC converter that prevents an improper recovery operation from occurring is obtained by employing the switching control circuit according to the invention.

BRIEF DESCRIPTION OF THE DRAWINGS

FIG. 4(a) is a wave chart describing an input voltage rise caused at the instant of a switching stop in the conventional switching control circuit that includes a brownout detection function and an improper recovery from the switching stop caused by the input voltage rise.

FIG. 4(b) is an expanded wave chart of FIG. 4(a).

DETAILED DESCRIPTION

Embodiments of the invention are described in detail below with reference to the drawings.

Figure 1:
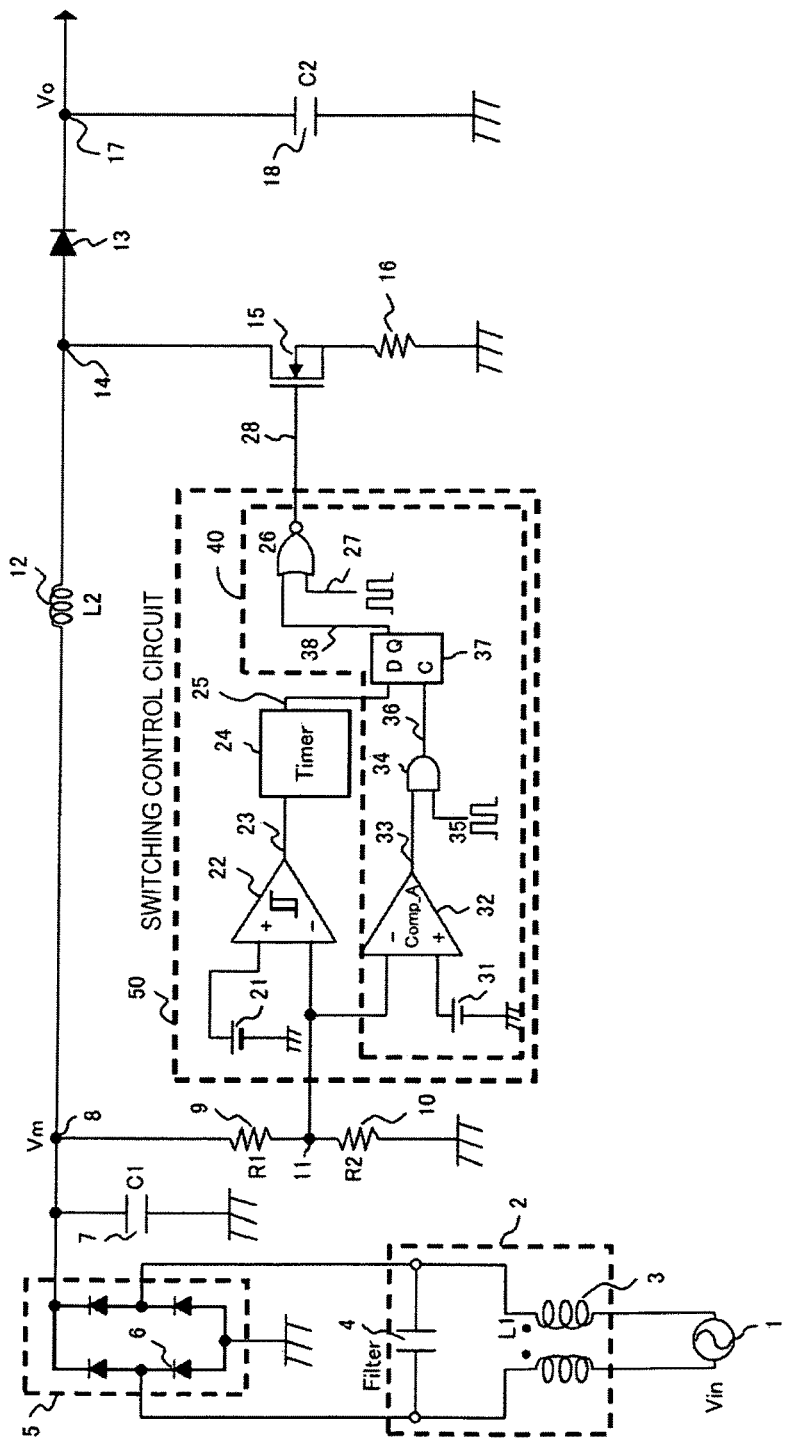
FIG. 1 is a block diagram showing a switching control circuit according to an embodiment of the invention and an AC/DC converter that employs the switching control circuit according to the embodiment of the invention.
Figure 2:
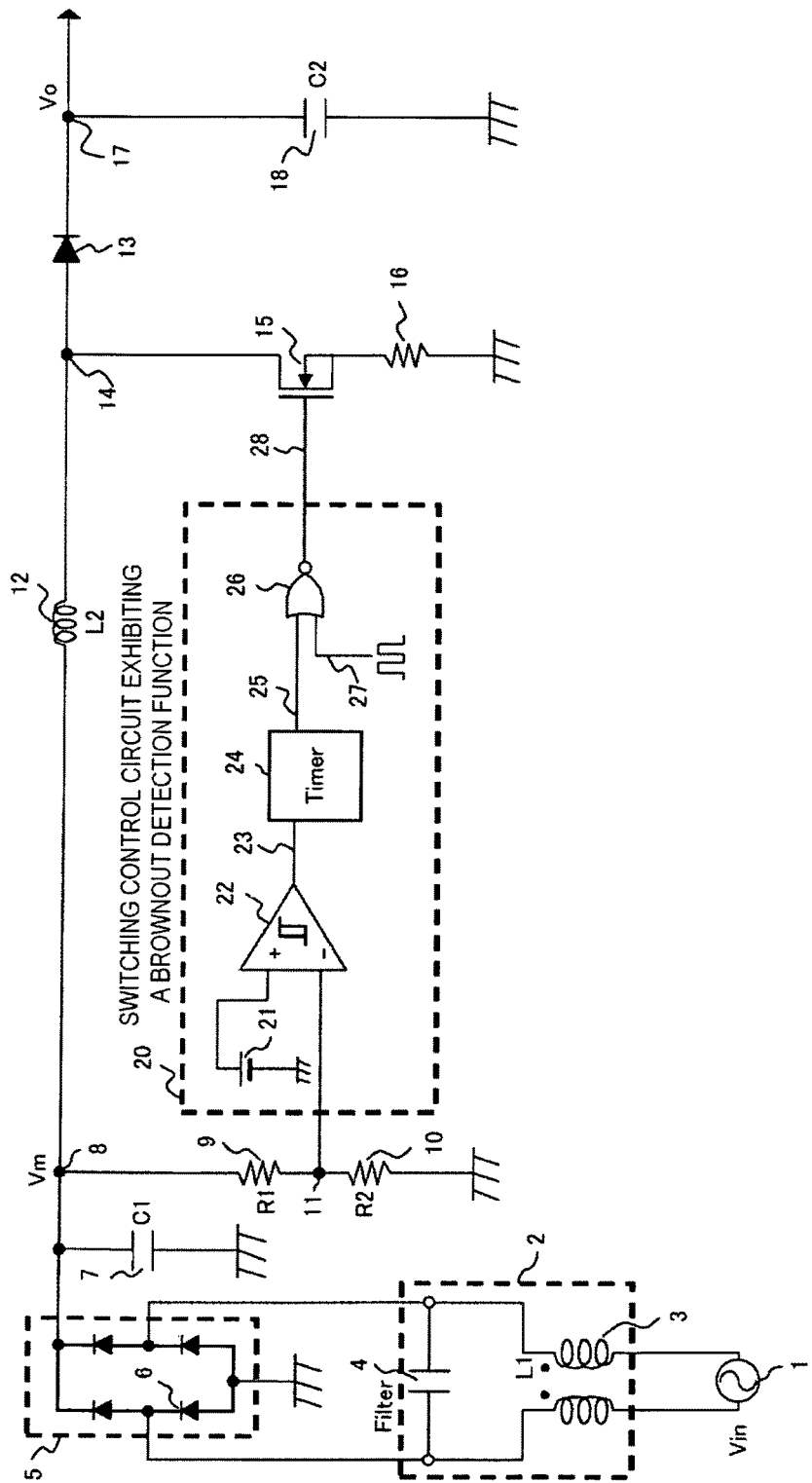
FIG. 2 is a block diagram showing a conventional switching control circuit that includes a brownout detection function and a conventional AC/DC converter that employs the conventional switching control circuit.

FIG. 1 is a block diagram showing a switching control circuit according to an embodiment of the invention and an AC/DC converter that employs the switching control circuit according to the embodiment of the invention. The same reference numerals as used in FIG. 2 are used to designate the same constituent elements in FIG. 1 (described above) and duplicated descriptions thereof will be omitted for the sake of simplicity.

In the same manner as in FIG. 2, the AC/DC converter shown in FIG. 1 has a structure that connects high-frequency-cut filter 2 (hereinafter referred to simply as "noise filter 2") to AC power supply 1 having a voltage Vin and a frequency 50 Hz, for example. Full-wave rectifying circuit 5 including rectifying diodes 6 is connected to the output stage of noise filter 2. First smoothing capacitor 7, having a capacitance C1, is connected between the output terminal of full-wave rectifying circuit 5 and ground. Dividing resistor 9, having a resistance R1, and dividing resistor 10, having a resistance R2, are connected between output terminal 8 of full-wave rectifying circuit 5 and ground. The voltage at output terminal 8 is Vm.

Noise filter 2 includes inductor 3, having an inductance L1, connected to AC power supply lines and capacitor 4 connected between the AC power supply lines. Output terminal 8 of full-wave rectifying circuit 5 is connected to reverse blocking diode 13 via inductor 12, having an inductance L2, as an energy storage element.

Switching device 15, including an N-channel MOSFET, and resistor 16 are connected in series to each other between connection point 14 of inductor 12 (the output terminal of inductor 12) and reverse blocking diode 13 and ground. One end of resistor 16 is connected to ground. Resistor 16 can be employed for detecting a current flowing through switching device 15. If it is not necessary to detect the current flowing through switching device 15, resistor 16 may be omitted.

A second smoothing capacitor 18, having a capacitance C2, is connected between ground and cathode terminal 17 of reverse blocking diode 13, a voltage at that point being denoted as $V_O$. The AC/DC converter is configured such that a desired DC voltage is obtained from the cathode terminal voltage $V_O$.

Now the brownout detection function will be described below. As described earlier, "brownout" implies that the power supply voltage is lower than the specified lower limit but higher than 0 V and the apparatus is in an intermediate state before it stops functioning (before a blackout occurs), in which the apparatus can not keep a normal state any more. Usually, the apparatuses are designed to perform a brownout detection function before stopping functioning (before a blackout happens). In the switching control circuit according to this embodiment, the divided voltage of the voltage Vm at output terminal 8 obtained from connection point 11 of resistors 9 and 10 is supplied to the negative input terminal of hysteresis comparator 22 in switching control circuit 50.

Hysteresis comparator 22 compares the divided voltage of the voltage Vm at output terminal 8 with a first reference voltage 21 received at the positive input terminal thereof. When hysteresis comparator 22 detects that the divided voltage is lower than first reference voltage 21, the output 23 of hysteresis comparator 22 feeds a high-level signal (hereinafter referred to as an "H-level") to timer 24.

Timer 24 counts the time period for which output 23 is in the H-level state. If the time period that timer 24 has counted up exceeds a predetermined time period, the output 25 of timer 24 provides an H-level signal to the D-terminal of D-type flip-flop (hereinafter referred to as a "DFF") 37. When the output 25 is at the H-level, this indicates that a brownout has been detected.

If output 23 from hysteresis comparator 22 returns to a low level (hereinafter referred to as the "L-level") before the predetermined time period elapses, timer 24 is reset.

The divided voltage of the voltage Vm at output terminal 8 obtained from the connection point 11 of resistors 9 and 10 is also inputted to the negative input terminal of comparator 32 (hereinafter referred to as "Comp_A 32"). Second reference voltage 31 is supplied to the positive input terminal of Comp_A 32. Comp_A 32 compares the divided voltage of the voltage Vm at output terminal 8 with second reference voltage 31. When Comp_A 32 detects that the divided voltage is lower than second reference voltage 31, Comp_A 32 feeds output 33 set at an H-level to AND circuit 34. In other words, Comp_A 32 sets output 33 therefrom at the H-level when Comp_A 32 detects (from the divided voltage of the voltage Vm at output terminal 8) that the AC input voltage Vin of AC power supply 1 is lower than a predetermined voltage value (that is, the phase angle of the AC input is low).

AND circuit 34 receives the output signal 33 from Comp_A 32 and a clock signal 35 generated by an internal oscillator (not shown). The output 36 of AMD circuit 34 is fed to the clock terminal of DFF 37. AND circuit 34 transmits clock signal 35 when the output from Comp_A 32 is at the H-level. AND circuit 34 interrupts clock signal 35 when output 33 from Comp_A 32 is at the L-level.

Output 25 from timer 24 is read into DFF 37 at the rising edge of clock signal 35 only when output 33 from Comp_A 32 is at the H-level. Q-output 38 from DFF 37 is set to the same value as output 25 from timer 24 that DFF 37 has read in. Output 38 is fed to one of the input terminals of NOR circuit 26.

Since output 25 from timer 24 is at the H-level, as described above, in the state in which a brownout has been detected, Q-output 38 set at the H-level is inputted to NOR circuit 26. To the other of the input terminals of NOR circuit 26, high-frequency pulse signal 27 is fed from a PWM control circuit or from a PFM control circuit (neither of which is shown).

Output 28 from NOR circuit 26 is fed to the gate terminal of switching device 15 to control the turning ON and OFF of switching device 15 (an N-channel MOSFET). The configuration described above sets the input signal to the gate terminal of switching device 15 at the L-level to control switching device 15 such that switching device 15 is OFF, if Q-output 38 from DFF 37 is set at the H-level.

Figure 3:
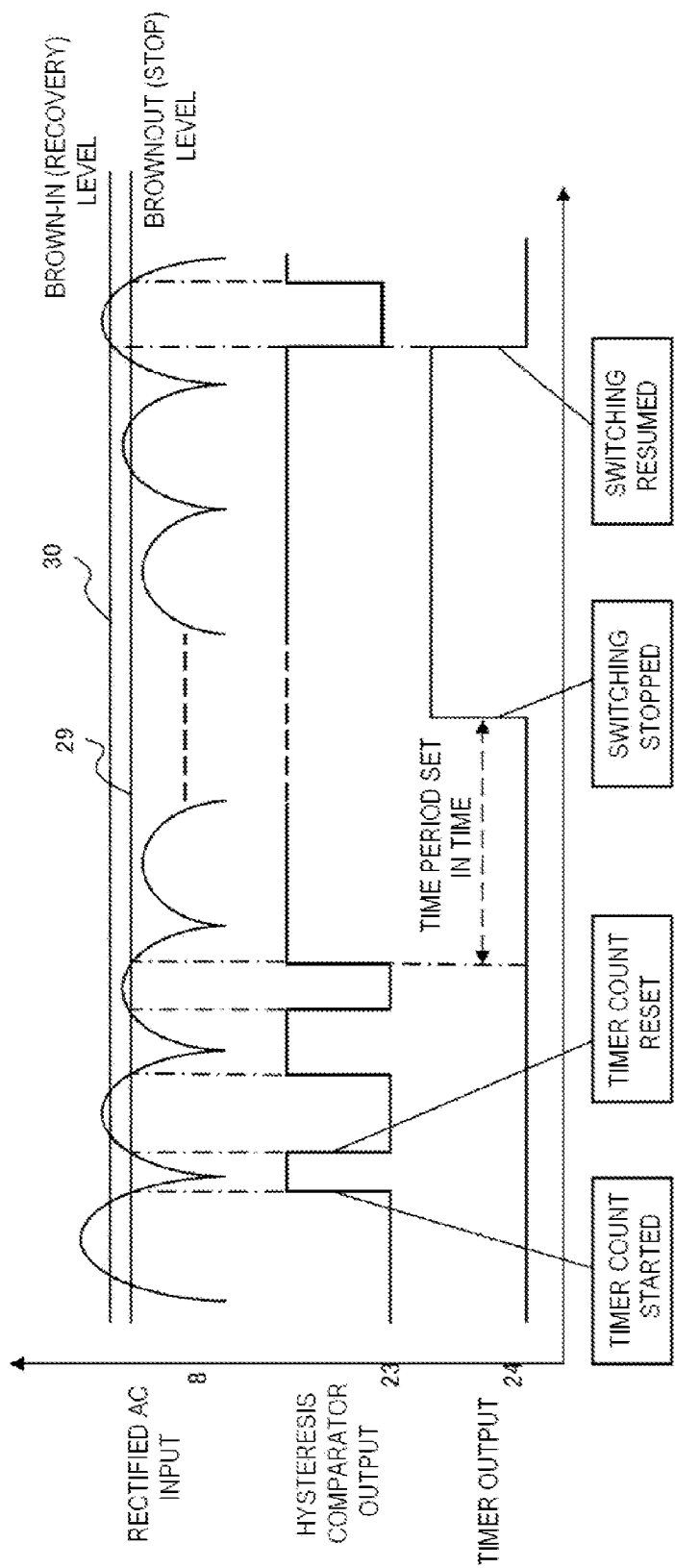
FIG. 3 is a timing chart describing the operation of the conventional switching control circuit that includes a brownout detection function.

The scheme described above makes it possible to stop the switching in the range in which the AC input phase angle is low, after the counting up of timer 24 for brownout detection is completed. Therefore the scheme described above makes it possible to prevent an improper brown-in operation, caused as described in FIGS. 4(a) and 4(b), by the input voltage Vm for brownout detection that rises after the switching stops and exceeds brown-in (recovery) voltage level 30 described in FIG. 3 to the higher side, from occurring.

In normal operation except for the brownout detection, output 25 from timer 24 is set at the L-level and output 25 set at the L-level is inputted to the D-terminal of DFF 37. Therefore, the Q-output from DFF 37 is held at the L-level without changing, even when clock signal 35 is fed to the clock terminal (C-terminal) of DFF 37.

The L-level signal is fed to one of the input terminals of NOR circuit 26 and high-frequency pulse signal 27 is fed to the other of the input terminals of NOR circuit 26. Therefore, NOR circuit 26 is controlled by high-frequency pulse signal 27. Since high-frequency pulse signal 27 is fed to the gate terminal of switching device 15, the ON and OFF of switching device 15 is controlled by high-frequency pulse signal 27.

Conventional switching control circuit 20 shown in FIG. 2 performs a brownout detection function. Switching control circuit 50 according to the embodiment of the invention shown in FIG. 1 performs a brownout detection function and an improper brown-in preventing function. Circuit block 40 in switching control circuit 50, including second reference voltage 31, comparator (Comp_A) 32, AND circuit 34, DFF 37, and NOR circuit 26 is one configuration of an improper brown-in preventing circuit for preventing an improper brown-in operation.

What is claimed is:

1. A switching control circuit for use in an AC/DC converter that includes a switching device, a noise filter, and a rectifying circuit which rectifies an AC input obtained from an AC source via the noise filter to obtain a rectified input voltage, the switching control circuit comprising:
    a brownout detector for detecting a brownout state when a maximum instantaneous value of the rectified input voltage has remained below a brownout level longer than a predetermined time period, the brownout detector including a first comparator that receives a first reference voltage and a timer for monitoring whether the maximum instantaneous value of the rectified input voltage has remained below the brownout level longer than the predetermined time period, the timer having an input terminal that receives an output signal from the comparator; and
    an improper brown-in operation preventing means for monitoring the rectified input voltage with a second comparator that receives a second reference voltage, and for stopping switching operation of the switching device, after the maximum instantaneous value of the rectified input voltage has remained below the brownout level longer than the predetermined period, when a phase angle of the AC input is in a low range,
    wherein the first reference voltage corresponds to the brownout level.

2. The switching control circuit according to claim 1, wherein the second comparator is a hysteresis comparator that comprises a signal corresponding to the rectified input voltage to the second reference voltage, and wherein the improper brown-in operation preventing means further comprises:
    a first logic means for passing a clock signal if the second comparator detects that the signal corresponding to the rectified input voltage is lower than the second reference voltage, the clock signal being an oscillating signal with a constant period;
    a flip-flop having a clock terminal that is coupled to an output terminal of the first logic means and having a data terminal that is coupled to an output of the timer; and
    a second logic means for passing or interrupting a switching control pulse signal based on an output signal from the flip-flop.

3. The switching control circuit according to claim 2, wherein the flip-flop is a D-type flip-flop.

4. An AC/DC converter having the switching control circuit of claim 1.

5. An AC/DC converter having the switching control circuit of claim 2.

6. An AC/DC converter, comprising:
    a noise filter,
    a rectifying circuit that rectifies an AC input obtained via the noise filter from an AC source to obtain a rectified voltage that is supplied to a first terminal,
    an inductor coupled between the first terminal and a second terminal,
    a switching device coupled to the second terminal, and
    switching control circuit that includes
        a brownout detector for detecting a brownout state when a maximum instantaneous value of the rectified voltage that is supplied to the first terminal remains below a brownout level longer than a predetermined time period, the brownout detector including a first comparator that receives a first reference voltage, means for coupling the comparator to the first terminal, and a timer for monitoring whether the maximum instantaneous value of the rectified voltage that is supplied to the first terminal has remained below a brownout level longer than the predetermined time period, the timer having an output terminal and having an input terminal that receives an output signal from the first comparator;
        stopping means, coupled to the output terminal of the timer, for stopping switching operation of the switching device after the maximum instantaneous value of the rectified voltage that is supplied to the first terminal has remained below the brownout level longer than the predetermined time period if a predetermined condition exists; and
        condition detector means for determining whether the predetermined condition exists the condition detector means including a second comparator that receives a second reference voltage,
    wherein the predetermined condition is that a phase angle of the AC input is in a low range, and
    wherein the first reference voltage corresponds to the brownout level.

7. The AC/DC converter according to claim 6, wherein the means for coupling the first comparator to the first terminal comprises a first resistor, and further comprising a second resistor that is coupled to the first resistor at an intermediate connection node.

8. The AC/DC converter according to claim 7, wherein the second comparator has a first input terminal that is coupled to the intermediate connection node and also has an output terminal, and wherein the condition detector means further comprises a logic circuit having a first input terminal that is coupled to the output terminal of the second comparator and having a second input terminal that receives a clock signal, the logic circuit additionally having an output terminal and the clock signal being an oscillating signal having a constant period.

9. The AC/DC converter according to claim 8, wherein the stopping means comprises a flip-flop having an input terminal that is coupled to the output terminal of the timer and having another input terminal that is coupled to the output terminal of the logic circuit, the flip-flop additionally having an output terminal.

10. The AC/DC converter according to claim 9, wherein the logic circuit in the condition detector means is a first logic circuit, and wherein the stopping means further comprises a second logic circuit having an input terminal that is coupled to the output terminal of the flip-flop and having a second input terminal that receives the clock signal.

11. The AC/DC converter according to claim 10, wherein the switching device has a control terminal, and the second logic circuit has an output terminal that is coupled to the control terminal of the switching device.

12. A switching control circuit for use in an AC/DC converter that includes a noise filter, a rectifying circuit that rectifies an AC input obtained via the noise filter from an AC source to obtain a rectified voltage that is supplied to a first terminal, an inductor coupled between the first terminal and a second terminal, and a switching device coupled to the second terminal, said switching control circuit comprising:
- a brownout detector for detecting a brownout state when a maximum instantaneous value of the rectified voltage that is supplied to the first terminal remains below a brownout level longer than a predetermined time period, the brownout detector including a first comparator that receives a first reference voltage, means for coupling the first comparator to the first terminal, and a timer for monitoring whether the maximum instantaneous value of the rectified voltage that is supplied to the first terminal has remained below the brownout level longer than the predetermined time period, the timer having an input terminal and having an output terminal that receives an output signal from the first comparator; and
- stopping means, coupled to the output terminal of the timer, for stopping switching operation of the switching device if the maximum instantaneous value of the rectified voltage that is supplied to the first terminal has remained below the brownout level longer than the predetermined time period and if a predetermined condition exists; and
- condition detector means for determining whether the predetermined condition exists, the condition detector means including a second comparator that receives a second reference voltage,
- wherein the predetermined condition is that the instantaneous voltage at the first terminal is low, to avoid improper brown-in operation of the switching control circuit, and wherein the first reference voltage corresponds to the brownout level.

13. An AC/DC converter having the switching control circuit of claim 12.

14. The switching control circuit according to claim 12, wherein the means for coupling the first comparator to the first terminal comprises a first resistor, and further comprising a second resistor that is coupled to the first resistor at an intermediate connection node.

15. The switching control circuit according to claim 12, wherein the second comparator has a first input terminal that is coupled to the intermediate connection node and also an output terminal, and wherein the condition detector means further comprises a logic circuit having a first input terminal that is coupled to the output terminal of the second comparator and having a second input terminal that receives a clock signal, the logic circuit additionally having an output terminal and the clock signal being an oscillating signal with a constant period.

16. The switching control circuit according to claim 15, wherein the stopping means comprises a flip-flop having an input terminal that is coupled to the output terminal of the timer and having another input terminal that is coupled to the output terminal of the logic circuit, the flip-flop additionally having an output terminal.

17. The switching control circuit according to claim 16, wherein the logic circuit in the condition detector means is a first logic circuit, and wherein the stopping means further comprises a second logic circuit having an input terminal that is coupled to the output terminal of the flip-flop and having a second input terminal that receives the clock signal.

18. The switching control circuit according to claim 17, wherein the switching device has a control terminal, and the second logic circuit has an output terminal that is coupled to the control terminal of the switching device.

\* \* \* \* \*